June 27, 1967     O. J. BALTZER     3,328,794
RADAR SYSTEM FOR DETERMINING THE RELATIVE DIRECTION
OF TWO OBJECTS MOVING IN SPACE Filed Aug. 19, 1949     4 Sheets-Sheet 1

INVENTOR.
OTTO J. BALTZER
BY
ATTORNEY

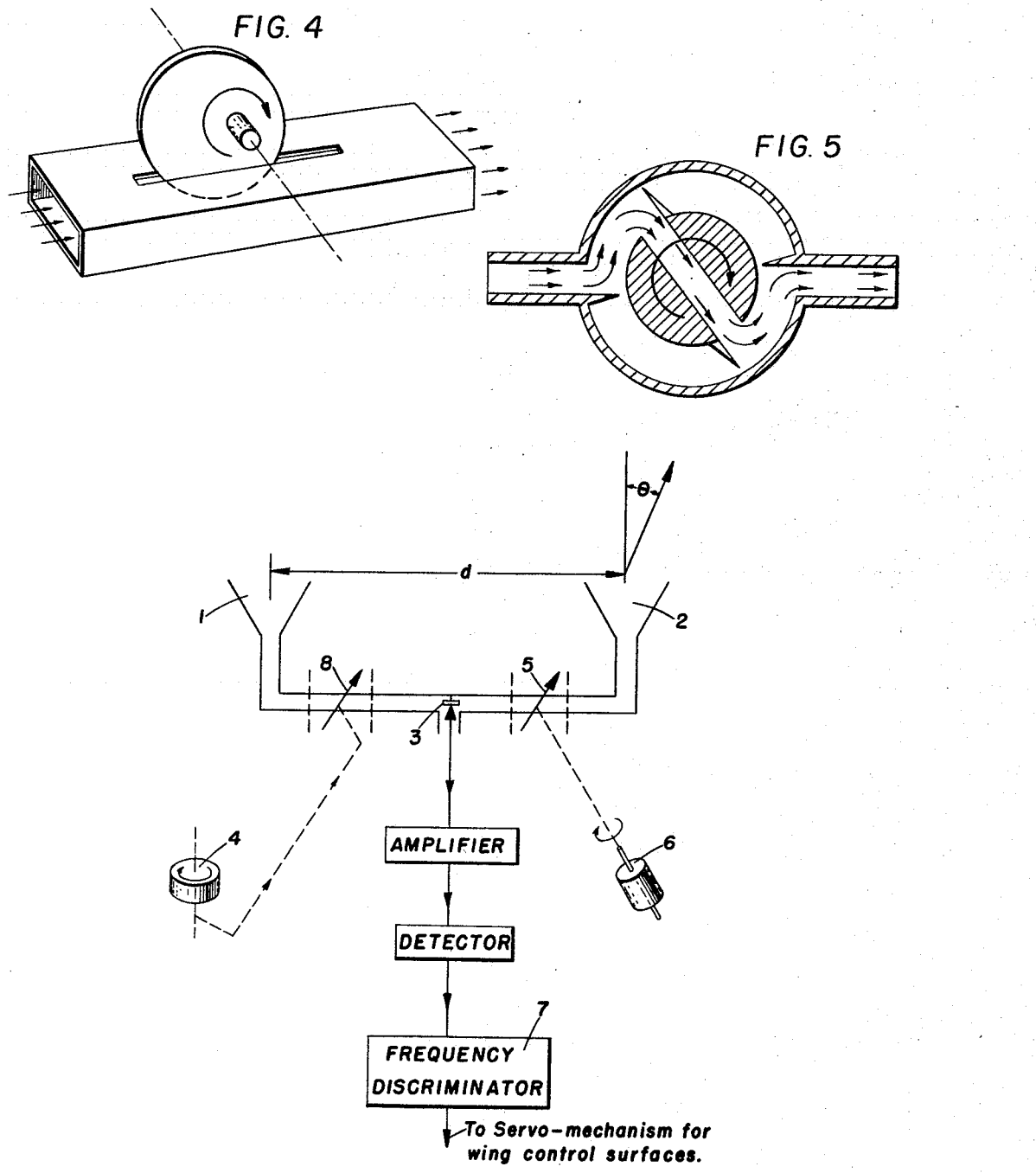

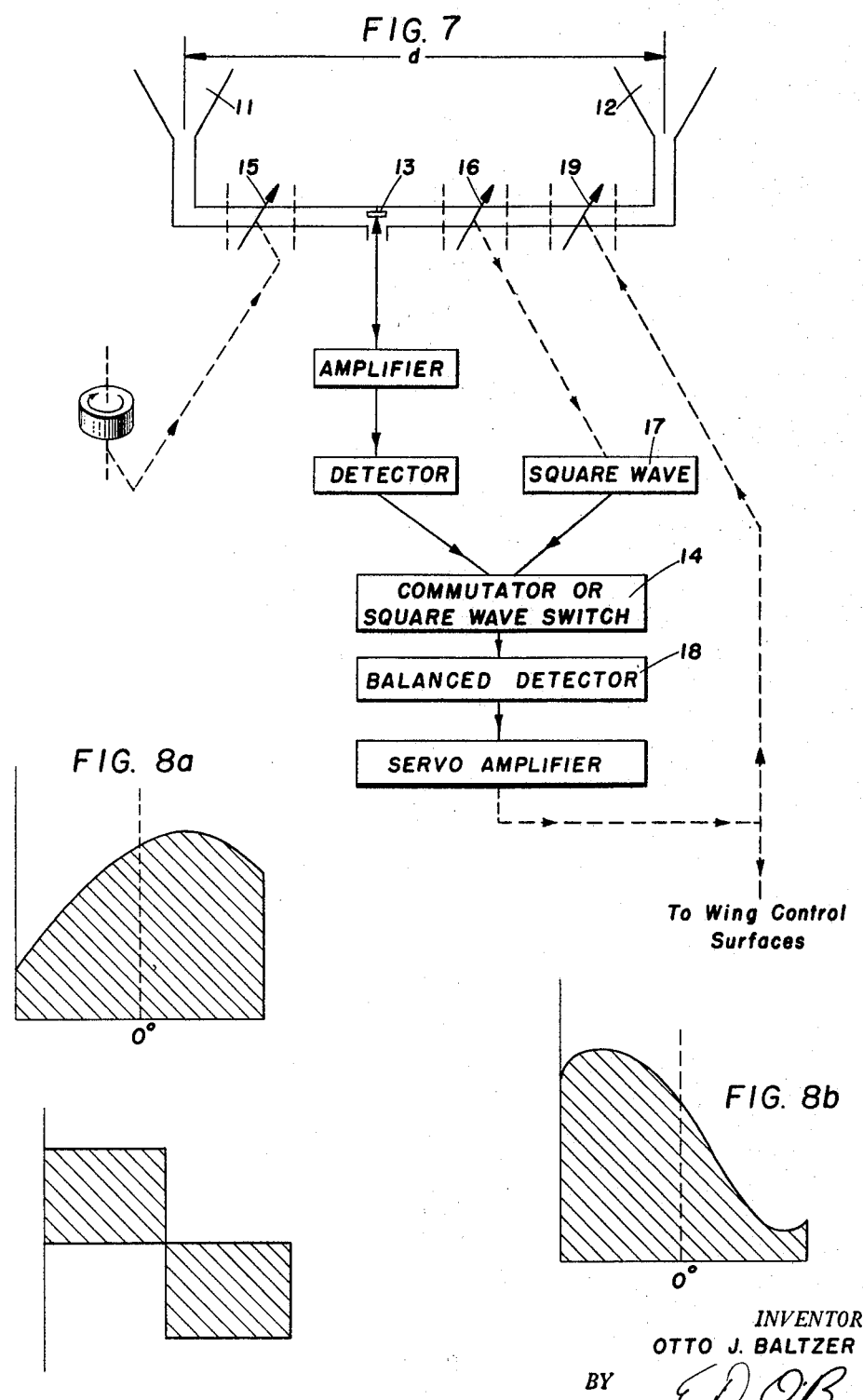

INVENTOR.
OTTO J. BALTZER
BY
ATTORNEY

United States Patent Office 3,328,794
Patented June 27, 1967

3,328,794
RADAR SYSTEM FOR DETERMINING THE RELATIVE DIRECTION OF TWO OBJECTS MOVING IN SPACE
Otto J. Baltzer, Austin, Tex., assignor to the United States of America as represented by the Secretary of the Navy
Filed Aug. 19, 1949, Ser. No. 111,313
4 Claims. (Cl. 343—7)

This invention relates to a microwave interferometer. More particularly the invention relates to a novel antenna scanning circuit and to a homing guidance system which is to be used in maintaining a radar homing guided missile on a constant bearing collision course with a radio energy emitting target irrespective of any evasive action in course or speed that such target might take.

Past methods of obtaining information of the angular position and the rate of change in angular position of a target employed such techniques as conical scanning, lobe switching, location of a null and simultaneous lobe comparison and of necessity required bulky antenna arrays as well as relatively complex differentiating circuits for obtaining information on the angular rate of change in position through a process of differentiation of the target angular position signals.

The present invention obtains this information by means of a compact circuit comprising a group of two or more relatively small microwave antennas which are separated by a comparatively large physical distance and which have a radiation interference pattern that is swept over a predetermined number of degrees in space about a bearing that is fixed relative to an arbitrarily selected reference direction. The information thus obtained is then used to actuate the control surfaces of a homing guided missile.

It is therefore an object of the present invention to provide an improved means for automatically determining the angular position and change in angular position of a point in space, with respect to a given reference point and reference line.

Another object of the invention is to provide a system for deriving a control signal that can be used in maintaining a homing guided missile on a constant bearing collision course.

A still further object of the present invention is to provide a simple and compact means that can be installed in a guided missile for automatically determining the angular position and change in angular position of a point in space relative to the missile.

Other objects and many of the attendant advantages of the invention will be appreciated readily as the same becomes understood by reference to the following detailed description, when considered in connection with the accompanying drawings, wherein:

FIG. 4 is a sketch illustrating one form of a phase shifter device that may be employed in the interferometer of FIG. 2 or in the guidance systems that constitute a part of the present invention.

FIG. 5 is a sketch of a second form of phase shifter device that may be employed in the microwave interferometer shown in FIG. 2.

FIG. 6 is a functional block diagram of a homing guidance system that incorporates the microwave interferometer of FIG. 2 and that forms a part of the present invention.

FIG. 7 is a functional block diagram of a second homing guidance system that also constitutes a part of the present invention.

FIG. 8a is a graphic presentation showing the amplitude of the signal received in the system illustrated in FIG. 7 for one target position.

FIG. 8b is a graph showing the amplitude of the signal received in the system of FIG. 7 for a second target position.

FIG. 9 illustrates the squarewave voltage signal that is combined with the signal shown in FIG. 8a or 8b in the system of FIG. 7.

FIG. 10a shows the output signal of the system illustrated in FIG. 7 when the input signal is similar to that shown in FIG. 8a.

Figure 1:
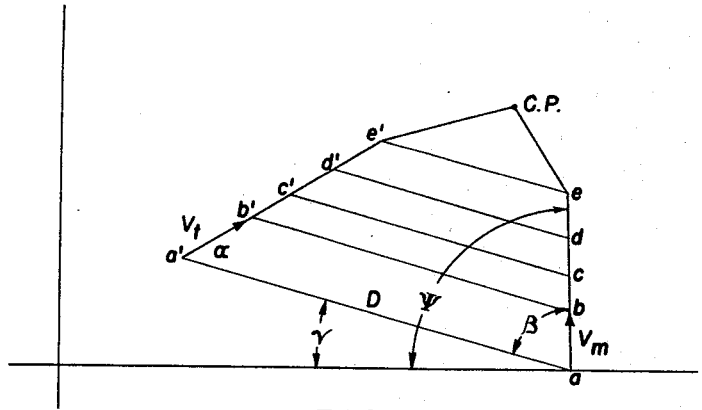
FIG. 1 is an illustration of the trigonometric relation of the paths followed by a target and a homing missile that are traveling through space on collision courses.

In order for a homing missile to maintain a constant collision course with a target it is not necessary to determine the location of the target with respect to said missile, either at the point of detection or at any subsequent time along the trajectory; instead it is sufficient to determine only the polarity (positive, negative, or zero) of the apparent change in true bearing of the target relative to an observer in the missile and to maintain the time derivative or rate of change of the true bearing of said target, zero. Referring to FIG. 1 of the drawings, the true bearing angle, $\gamma$, is defined as the angle formed by the line of sight vector from the missile to a target with respect to any arbitrary reference direction fixed in space and is equal to the angle $\psi$, which represents the direction of flight of the missile as measured from the same fixed reference direction, minus the angle $\beta$, which is the relative bearing of the target as measured from the axis of the missile. Assuming that the range D is a decreasing function with time, the requirement for a collision path will be satisfied if the following condition can be maintained:

$$\frac{V_t \sin \alpha - V_m \sin \beta}{D} = 0 \qquad \text{(Eq. 1)}$$

where $V_t$ is the velocity of the target, $\alpha$ is the relative bearing of the missile as measured from the direction of travel of the target, and $V_m$ is the velocity of the missile. This condition may also be expressed by the equation relating the time rate of change of the relative bearing angle $d\beta/dt$ to the angular velocity $d\psi/dt$ of the missile, and to the translating velocities $V_m$ and $V_t$ of the missile and target:

$$\frac{d\gamma}{dt} = \frac{d\psi}{dt} - \frac{d\beta}{dt} = \frac{V_t \sin \alpha - V_m \sin \beta}{D} \qquad \text{(Eq. 2)}$$

As shown in Eq. 1, when maintaining a collision course the expression on the right vanishes so that $$\frac{d\gamma}{dt} = \frac{d\psi}{dt} - \frac{d\beta}{dt} = 0 \qquad \text{(Eq. 3)}$$

The problem of succesfully maintaining a constant bearing collision course can therefore be solved if some practical method is devised whereby the quantity $$\frac{d\psi}{dt} - \frac{d\beta}{dt}$$

or at least its polarity, can be determined to be either positive, negative, or zero in value and then utilized as an error signal for actuating the control surfaces of the missile in order to maintain the proper collision course $$\frac{d\psi}{dt} - \frac{d\beta}{dt} = 0$$

Figure 2:
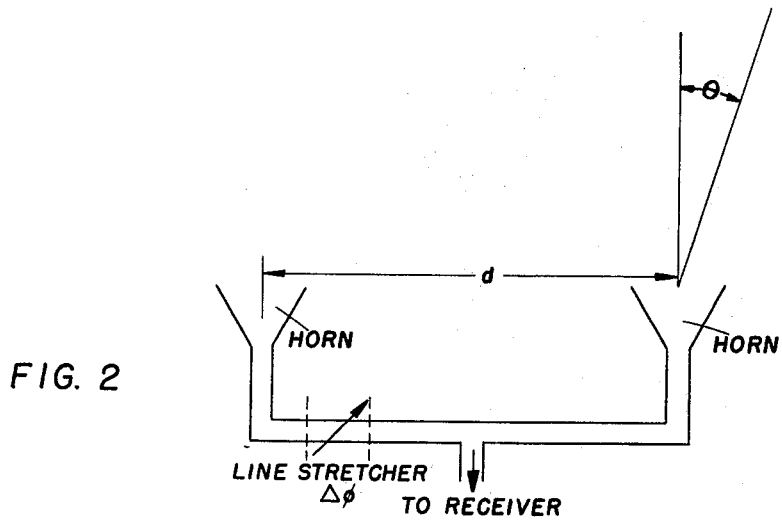
FIG. 2 is a schematic diagram illustrating the microwave interferometer that forms a part of the present invention.
Figure 3:
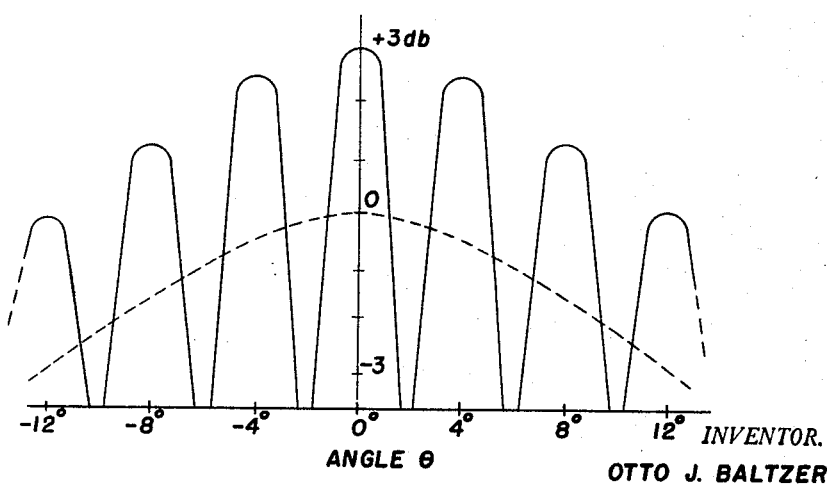
FIG. 3 is a graphic illustration of the approximate radiation pattern obtained in space from the interferometer illustrated in FIG. 2.

One practical method for determining $$\frac{d\psi}{dt} - \frac{d\beta}{dt}$$

involves the use of a highly directive microwave pulse transmitter that is situated on the ground and that illuminates a target in space and a receiver incorporating the novel antenna sweep circuit illustrated in FIG. 2 of the drawings. The sweep circuit comprises a pair of microwave horns which are separated by a distance $d$ that is relatively large in comparison with the dimensions of the horns and which are joined by a common wave guide structure so that the signals from the two antenna branches can be combined vectorially in amplitude and phase in a single crystal detector. Restricting the present discussion to the case of guidance control in the azimuthal plane alone, for it is assumed that elevation control will be derived from a similar set of horns arranged in the vertical plane, the interference radiation pattern of the combined horns will be made up of many narrow lobes having an envelope identical with the primary pattern of a single horn as shown in FIG. 3 of the drawings. If the waveguide structure is completely symmetrical so that the electrical lengths in the passage from either horn to the crystal are identical, the angular positions $\theta$ of these lobes relative to the axis of the missile are given by the relation $$n\lambda = d \sin \theta \qquad (Eq. 4)$$

where $\lambda$ is the wavelength of the impinging wave and $n$ is the number of wavelengths difference in phase of a signal picked up by the horns. In a specific example of the receiver structure, for two horns separated by a distance $d = 18''$ and excited by a signal having a wavelength = 3.2 cm., the interference radiation pattern of the antennas was found to have lobe maxima at approximately the following angles measured from the axis of the missile; $\theta = 0°, \pm 4°, \pm 8°, \pm 12°, \pm 16° \ldots$ The lobe pattern of the antenna system described above may be shifted to the left by increasing, or to the right by decreasing the electrical length of the wave guide leading to one of the horns; if such an increase or decrease is sufficient to produce a shift of 180° in the wave guide, the position of what was a lobe maximum in space will become the position of a minimum; for any general phase shift, $\Delta\phi$, measured in degrees, in the wave guide structure, the lobe structure in space will be rotated through an angular extent:

$$\Delta\theta = \frac{\lambda}{2\pi d} \cdot \Delta\phi \text{ degrees} \qquad (Eq. 5)$$

Thus, by inserting a phase shifting device such as is illustrated in either FIG. 4 or 5 of the drawings in the waveguide section leading to one of the horns, the lobe pattern can be shifted to either the right or the left, or can be made to scan continuously, or to oscillate with controllable amplitude about any given angular bearing.

For the purpose of determining the angular rate of change in the true bearing of a target and its polarity, the above described system may be modified by the addition of a gyro-stabilized phase shifter in the waveguide leading to one of the horns. By such modification, if a homing guided missile utilizing such a system should execute a 5° turn to the right while maneuvering to maintain a collision course with the target, the gyro-stabilized phase shifter would act to shift the lobe pattern 5° to the left with respect to the axis of the missile to thereby keep the lobe pattern independent of angular movement of said missile. With the lobe pattern thus fixed in space and independent of the missile's turning motion, if the missile is not traveling towards the target on a constant bearing collision course so that the true bearing of the target as measured from the arbitrarily fixed reference direction gradually changes, the target will intercept one maximum-minimum lobe at a rate determined by its angular velocity to thereby superimpose a modulation signal having a frequency proportional to its angular velocity on the received signal. By detecting this superimposed modulation signal and determining its polarity, an indication of the angular rate of change in bearing of the target can be derived.

One specific embodiment of a homing guidance system incorporating the fixed lobe pattern method of angular rate determination is illustrated in FIG. 6 of the drawings wherein the signals received by the two horns 1 and 2 are combined and fed to a common crystal detector 3 and thence to a conventional frequency modulation receiver for amplification and detection. Inserted in the waveguide leading from horn 1 is a phase shifter 8, which may be of the type illustrated in FIG. 5, which is mechanically coupled through suitable gearing to a gyroscope 4 that is mounted in the missile; by this means the lobe pattern in space is maintained independently of any angular turning motion of the missile. A second phase shifter 5, which also may be of the type illustrated in FIG. 5 is mounted in the waveguide section leading from horn 2 and is continuously rotated by a motor 6 so that the phase delay produced thereby increases at a rate sufficient to sweep a predetermined number of lobe maxima per second past a point in space. The effect of phase shifter 5 is to rotate the lobes of the radiation pattern continuously clockwise or counterclockwise in a manner similar to the rotation of the spokes of a wheel. Phase shifters 8 and 5 together serve to sweep the lobes of the radiation pattern over a fixed angle in space at a fixed rate so that the signal from a target that is on a constant bearing course will reflect a signal having a modulation frequency that is equal to the sweep frequency of the lobes only. If the target is not on a constant bearing course, the received signal from the target will show a positive or negative deviation from the equilibrium frequency depending upon whether the target bearing is changing counter to or in the same direction as the rotation of the lobes of the radiation pattern. For example, assuming the lobes to be rotated at a rate such that 30 maxima per second pass a point in space and that the target is moving in the same direction as the rotation of the lobes, the modulation frequency imposed on the received signal will be less than 30 cycles per second; and if the target is moving counter to the rotation of the lobes, the modulation frequency will be greater than 30 cycles per second. The imposed modulation signal is detected by a frequency discriminator 7 that is tuned to a frequency of 30 cycles per second so that the polarity of its output will depend upon the sign of the frequency deviation. The discriminator output is then used as a source of control potential for the servo-mechanism that actuates the proper wing deflection surfaces for bringing the missile back to a constant bearing collision course in azimuth.

Figure 10A:
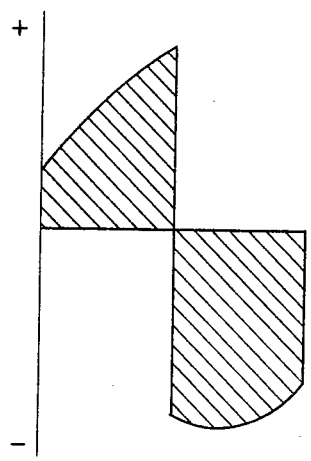
Figure 10B:
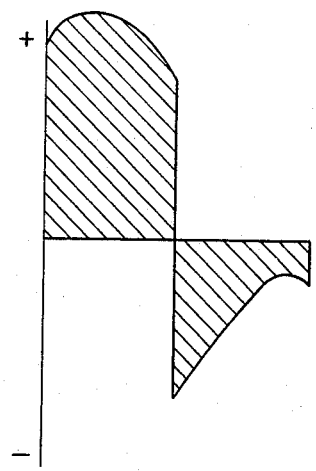
FIG. 10b is a graphic illustration of the output signal of the system of FIG. 7 when the input signal is similar to that shown in FIG. 8b.

Because of the difficulties encountered in designing a discriminator sufficiently sensitive to respond to a minute difference in the received modulation signal, a second system for determining the rate of change in angular position of a target was devised and is illustrated in FIG. 7. This system comprises a pair of horn antennas 11 and 12 spaced apart a distance $d$ and joined by wave guides to a common crystal detector 13 wherein the signals from each of the horns are combined. The signal obtained from the crystal detector is then fed through an amplifier and detector to a square wave switch 14, the purpose of which will be explained more fully hereinafter. A gyro-stabilized phase shifter 15 which is similar to the gyro-stabilized phase shifter described with relation to FIG. 6 is mounted on the wave guide leading from horn 11 and serves to maintain the radiation pattern of the antennas independent of any turning motion of the missile. Mounted on the wave guide leading from horn 12 is a second phase shifter illustrated in FIG. 4. Phase shifter 16 is mechanically coupled to a driving motor, not shown, that is keyed by a square wave generator 17 and serves to rapidly scan or oscillate the lobes of the radiation pattern through some predetermined angle in space, the magnitude of which is not critical so long as it is sufficiently great to insure that one of the lobes scans the target. The amplitude of a received signal during the scanning operation will vary with the value $A\phi_2$, where $A\phi_2$ is the number of degrees phase shift induced in the wave guide by phase shifter 16. Referring to FIGS. 8a and 8b of the drawings the amplitude of the received signal plotted against the number of degrees phase shift is illustrated for two different target positions; in FIG. 8a the constant bearing line required for collision is shown at 0° phase shift and, as indicated by the point of maximum reception, the target is off to the left of this line; in FIG. 8b the target is to the right of the constant bearing line. In order to differentiate between target position signals relative to the constant bearing line, the received signal is combined with a square wave voltage, such as is illustrated in FIG. 9, in the square wave switching circuit 14 and balanced detector 18 to produce the combined waveform illustrated in FIGS. 10a and 10b. As illustrated in these two figures the net polarity of the resultant output signal will depend upon the phase position of the maximum received signal in relation to the constant bearing line and will have an average negative value if the target is to the left of this line and will have an average positive value if the target is to the right of the line; therefore, this signal may be used as an error control voltage to adjust the phase position of a third phase shifter 19 as well as to actuate the servo system that controls the flight control surfaces of the missile. Thus as the missile turns to center on a constant bearing collision course with the target, the third phase shifter 19 offsets the effect of gyro-stabilized phase shifter 15 by an amount sufficient to allow the radiation pattern to be shifted in space relative to the fixed reference direction so that the lobe maximum for 0° phase shift or phase shifter 16 will be centered on the true bearing of the target.

Figure 11:
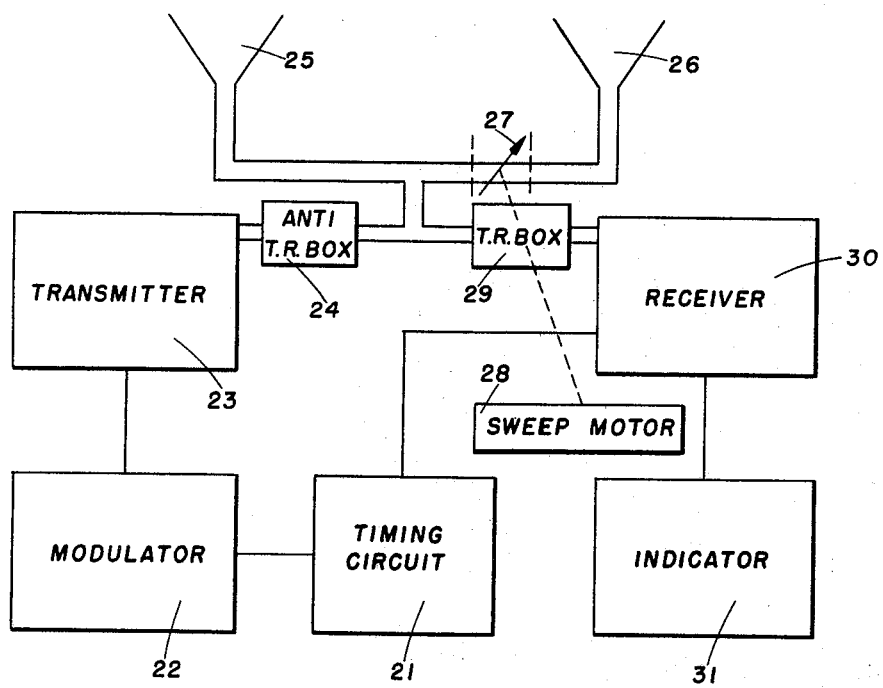
FIG. 11 is a functional block diagram of a radar system that incorporates the novel antenna sweep circuit of the invention.

A third system incorporating the novel antenna sweep circuit of the invention is illustrated in FIG. 11 of the drawings. The system constitutes a fixed antenna radar set for determining the rate of change in angular position of a target in space and comprises a timing circuit 21 that keys a modulating unit 22 which in turn triggers off a microwave pulse transmitter 23. The output of transmitter 23 is fed through a wave guide section including an anti T–R box 24 to a common junction and thence through two separate wave guide sections to a pair of microwave horns 25, 26. The wave guide section leading to horn 26 has disposed therein a phase shifting device 27 which is similar in construction to that shown in FIG. 5 of the drawings and which is mechanically coupled to and driven by a sweep motor 28. Phase shifting device 27 serves to vary the electrical length of the wave guide section leading to horn 26 to thereby produce a sweeping of the interference radiation pattern of the horns as previously described. The sweeping pattern will then intercept a target at a rate dependent upon the number of radiation lobe maxima swept past the target per second to thereby superimpose a modulation signal on the received wave that is indicative of the rate of change in angular position of the target. The received wave is picked up by the horns 25, 26 and fed through a T–R box 29 to the input of a receiver 30 which is similar in construction to the receiver shown in FIG. 6 of the drawings, and which is keyed by timing circuit 21. The output of receiver 30 is then fed to an indicating circuit 31 which may comprise a cathode ray tube, a switching circuit or some similar apparatus for indicating the polarity of the discriminator output.

Obviously many modifications and variations of the present invention are possible in the light of the above teachings. It is therefore to be understood that within the scope of the appended claims the invention may be practiced otherwise than as specifically described.

What is claimed is:

1. An antenna scanning system for a moving missile comprising a pair of microwave antennas, said antennas being spaced apart a relatively large distance in comparison to the dimensions thereof, a common detector for said antennas, wave guide sections respectively connecting said antennas to said detector, a gyro-stabilized phase shifting device in one of said wave guide sections for maintaining the radiation pattern of said antennas independent of any angular movement of the missile, a second continuously variable phase shifter in the other waveguide section, and means for operating said second phase shifter.

2. A system for determining the angular position of an object in space, comprising a source of radio frequency signals illuminating said object, a receiver energized by radio frequency signals reflected from said object, said receiver including a plurality of microwave antennas, said antennas being spaced apart a relatively large physical distance in comparison to the dimensions thereof, a common detecting device, a plurality of wave guide sections connecting said antennas to said common detecting device, a gyro-stabilized phase shifting device in one of said wave guide sections whereby the lobe pattern in space is maintained independently of any angular turning motion of the system and a constantly variable phase shifting device in the other wave guide section.

3. A system for determining the change in angular position of an object in space relative to a guided missile, comprising a source of radio frequency signals illuminating said object, a receiver carried by said missile receiving signals reflected from said object, said receiver including at least a pair of microwave antennas, said antennas being spaced apart a relatively large physical distance in comparison to the dimensions of the antenna, a common detecting device, a pair of wave guides connecting said antennas to said detecting device, a phase shifting device in one of said wave guides, a gyroscope coupled to and controlling said phase shifter for maintaining the radiation pattern of said antennas independent of any turning motion the missile might make, a second, motor driven, phase shifter imposed in said other wave guide section for rotating said radiation pattern in space, and a frequency discriminator coupled through a detector and amplifier stage to the output of said non-linear detecting device.

4. A system for determining the change in angular position of an object in space relative to a guided missile, comprising a source of radio frequency signals illuminating said object, a receiver carried by said missile receiving signals reflected from said object, said receiver including at least a pair of microwave antennas, said antennas being spaced apart a relatively large physical distance in comparison to the dimensions of the antenna, a common detecting device, a pair of wave guides connecting said antennas to said detecting device, a phase shifting device in one of said wave guides, a gyroscope coupled to and controlling said phase shifter for maintaining the radiation pattern of said antennas independent of any turning motion the missile might make, a second, rotating, phase shifting device disposed in said other wave guide section for causing the interference radiation pattern of said antennas to oscillate about a fixed bearing, a square wave voltage source coupled to and controlling the action of said rotating phase shifter, a combining circuit, means for supplying the signal derived in said common non-linear detecting device to said combining circuit along with a signal from said square wave voltage source, and a third phase shifter disposed in the wave guide containing said rotating phase shifter and coupled to and controlled by the output of said combining circuit, said combining circuit also being coupled to energize the control surfaces of said missile.

References Cited

UNITED STATES PATENTS

| | | | |
|---|---|---|---|
| 2,419,205 | 4/1947 | Feldman | 250—33.63 |
| 2,426,658 | 9/1947 | Woolridge. | |
| 2,437,281 | 3/1948 | Tawney | 250—33.63 |
| 2,461,005 | 2/1949 | Southworth | 343—18 X |
| 2,463,094 | 3/1949 | Field et al. | 250—33.651 X |
| 2,464,276 | 3/1949 | Varian | 250—33.63 |
| 2,468,751 | 5/1949 | Hansen et al. | |
| 2,554,119 | 5/1951 | Perham | 250—33.651 |

OTHER REFERENCES

Proceedings of the I.R.E., March 1940, Multiunit Electromagnetic Horns, Barrow et al., pp. 130–136.

RODNEY D. BENNETT, *Primary Examiner.*

JAMES L. BREWRINK, NORMAN H. EVANS, *Examiners.*

A. GAUSS, F. M. STRADER, M. H. KARR, T. H. TUBBESING, *Assistant Examiners.*